(12) United States Patent
Fu et al.

(10) Patent No.: US 11,422,334 B2
(45) Date of Patent: Aug. 23, 2022

(54) DRIVING MECHANISM

(71) Applicant: TDK TAIWAN CORP., Taoyuan (TW)

(72) Inventors: Kai-Jing Fu, Taoyuan (TW);
Chao-Chang Hu, Taoyuan (TW);
Min-Hsiu Tsai, Taoyuan (TW);
Mao-Kuo Hsu, Taoyuan (TW);
Juei-Hung Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 203 days.

(21) Appl. No.: 16/738,510

(22) Filed: Jan. 9, 2020

(65) Prior Publication Data

US 2020/0271895 A1 Aug. 27, 2020

Related U.S. Application Data

(60) Provisional application No. 62/809,891, filed on Feb. 25, 2019.

(30) Foreign Application Priority Data

Dec. 20, 2019 (EP) .................................. 19218906

(51) Int. Cl.
*G02B 26/08* (2006.01)
*G02B 7/182* (2021.01)
*H02K 33/16* (2006.01)
*G06V 20/64* (2022.01)

(52) U.S. Cl.
CPC ....... *G02B 7/1821* (2013.01); *G02B 26/0816* (2013.01); *G06V 20/653* (2022.01); *H02K 33/16* (2013.01)

(58) Field of Classification Search
CPC .................. G02B 7/1821; G02B 26/0816; G02B 26/085; H02K 33/16; H02K 33/18; G06K 9/00214
USPC ...................................................... 359/224.1
See application file for complete search history.

(56) References Cited

U.S. PATENT DOCUMENTS

| | | | | |
|---|---|---|---|---|
| 6,122,089 | A | * | 9/2000 | Minamoto ........... G02B 26/105 359/198.1 |
| 8,390,912 | B2 | * | 3/2013 | Nakamura ............ B81B 3/0021 359/224.1 |
| 2018/0231640 | A1 | * | 8/2018 | Han ..................... G02B 26/101 |

* cited by examiner

*Primary Examiner* — Euncha P Cherry
(74) *Attorney, Agent, or Firm* — Muncy, Geissler, Olds & Lowe, PC

(57) ABSTRACT

A driving mechanism is provided, including a fixed part, a movable part for holding an optical element, and a driving assembly. The movable part is movable relative to the fixed part and has a first resonance frequency with respect to the fixed part. The driving assembly is configured to drive the movable part to rotate back and forth within a range relative to the fixed part.

22 Claims, 17 Drawing Sheets

DRIVING MECHANISM

CROSS REFERENCE TO RELATED APPLICATIONS

This Application claims priority of provisional U.S. Patent Application Ser. No. 62/809,891, filed on Feb. 25, 2019, and European Patent Application No. 19218906.6, filed Dec. 20, 2019, the entirety of which is incorporated by reference herein.

BACKGROUND OF THE INVENTION

Field of the Invention

The application relates in general to a driving mechanism, and in particular, to a driving mechanism for moving an optical element.

Description of the Related Art

With the progress being made in 3D sensing technologies, Advanced Driver

Assistance Systems (ADAS) have been installed in modern vehicles. For example, Advanced Driver Assistance Systems (ADAS) may have such functions as real-time 3D object detection, large-scale 3D vehicle detection, and 3D object recognition.

Conventional 3D sensing technologies may be implemented by applying light detection and ranging (LiDAR), infrared detection, or ultrasound detection. However, to improve the efficiency and reduce the sizes of conventional 3D sensing devices become a challenge.

BRIEF SUMMARY OF INVENTION

In view of the aforementioned problems, the object of the invention is to provide a driving mechanism that includes a fixed part, a movable part for holding an optical element, and a driving assembly. The movable part is movable relative to the fixed part and has a first resonance frequency with respect to the fixed part. The driving assembly is configured to drive the movable part to rotate back and forth within a range relative to the fixed part.

In some embodiments, the movable part has a spring sheet that has two fixed ends affixed to the fixed part and a stage for carrying the optical element, and the driving assembly has at least a magnet and at least a coil respectively disposed on the fixed part and the stage.

In some embodiments, the spring sheet has two deformable portions respectively extending from the fixed ends to the stage.

In some embodiments, the spring sheet has a longitudinal structure, and the stage rotates around a long axis of the spring sheet.

In some embodiments, an AC current signal is applied to the coil, and the frequency of the AC current signal corresponds to the first resonance frequency.

In some embodiments, the frequency of the AC current signal is from 0.9 to 1.1 times of the first resonance frequency.

In some embodiments, the driving mechanism further comprises a plurality of magnets and magnetic permeable sheets respectively connected to the magnets, wherein the spring sheet has a substantially rectangular structure, and the magnets and the magnetic permeable sheets are disposed on two long sides of the spring sheet.

In some embodiments, the coil is integrally formed on the spring sheet by metallic printing ink or circuit-on-metal technology.

In some embodiments, the driving mechanism further comprises a circuit integrally formed on the spring sheet by metallic printing ink or circuit-on-metal technology, wherein the circuit and the coil are formed on opposite sides of the spring sheet.

In some embodiments, the driving mechanism further comprises a light emitter, a light receiver, and a mirror, wherein the optical element is disposed on a top side of the stage, the mirror is disposed on a bottom side of the stage, and a sensing light is generated from the light emitter and reflected by the mirror to the light receiver for sensing a posture angle of the optical element.

In some embodiments, the driving assembly further has a bobbin affixed to the stage and two coils wound on the bobbin.

In some embodiments, the driving mechanism further comprises two circuits respectively connected to the coils and integrally formed on the spring sheet by metallic printing ink or circuit-on-metal technology.

In some embodiments, the driving mechanism further comprises a light emitter and a light receiver, wherein a sensing light is generated from the light emitter to the light receiver, and at least one of the light emitter and the light receiver is disposed on the spring sheet.

In some embodiments, the driving mechanism further comprises a light emitter and a light receiver, wherein a sensing light is generated from the light emitter and reflected by the stage to the light receiver for sensing a posture angle of the optical element and the stage.

In some embodiments, the stage forms a through hole, and the optical element comprises a double-sided mirror received in the through hole.

In some embodiments, the driving assembly further has a plurality of magnets including a plurality of first magnets and second magnets, the coil and the first magnets produces a first magnetic force driving the stage to rotate relative to the fixed part around a first axis, and the coil and the second magnets produces a second magnetic force driving the stage to rotate relative to the fixed part around a second axis.

In some embodiments, the spring sheet has two meandering deformable portions respectively extending from the fixed ends to the stage.

In some embodiments, the spring sheet further has a second resonance frequency with respect to the fixed part, and a first AC current signal and a second AC current signal are sequentially applied to the coil in a first time interval and a second time interval, wherein the frequencies of the first and second AC current signals correspond to the first and second resonance frequencies.

In some embodiments, the spring sheet further has a second resonance frequency with respect to the fixed part, and the driving assembly further has two coils, wherein the first AC current signal and a second AC current signal are respectively applied to the two coils, and the frequencies of the first and second AC current signals correspond to the first and second resonance frequencies.

The driving mechanism as claimed in claim 2, wherein the driving assembly drives the stage to rotate around a first axis, and the driving mechanism further comprises a circuit integrally formed on the spring sheet by metallic printing ink or circuit-on-metal technology, wherein a segment of the circuit is parallel to the first axis, and the segment at least partially overlaps the first axis when viewed in a direction perpendicular to the spring sheet.

In some embodiments, the driving assembly drives the stage to rotate around a first axis, and the driving mechanism further comprises a circuit integrally formed on the spring sheet by metallic printing ink or circuit-on-metal technology, wherein a plurality of segments of the circuit are parallel to the first axis, and the segments do not overlap the first axis when viewed in a direction perpendicular to the spring sheet.

In some embodiments, the movable part comprises a spring sheet that has four fixed ends affixed to the fixed part, a stage for carrying the optical element, and four deformable portions respectively connecting the four fixed ends to the stage, wherein the driving assembly has a plurality of magnets disposed on the fixed part and at least a coil disposed on the stage, and the fixed ends are located at four corners of a rectangular area that is defined by the spring sheet.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
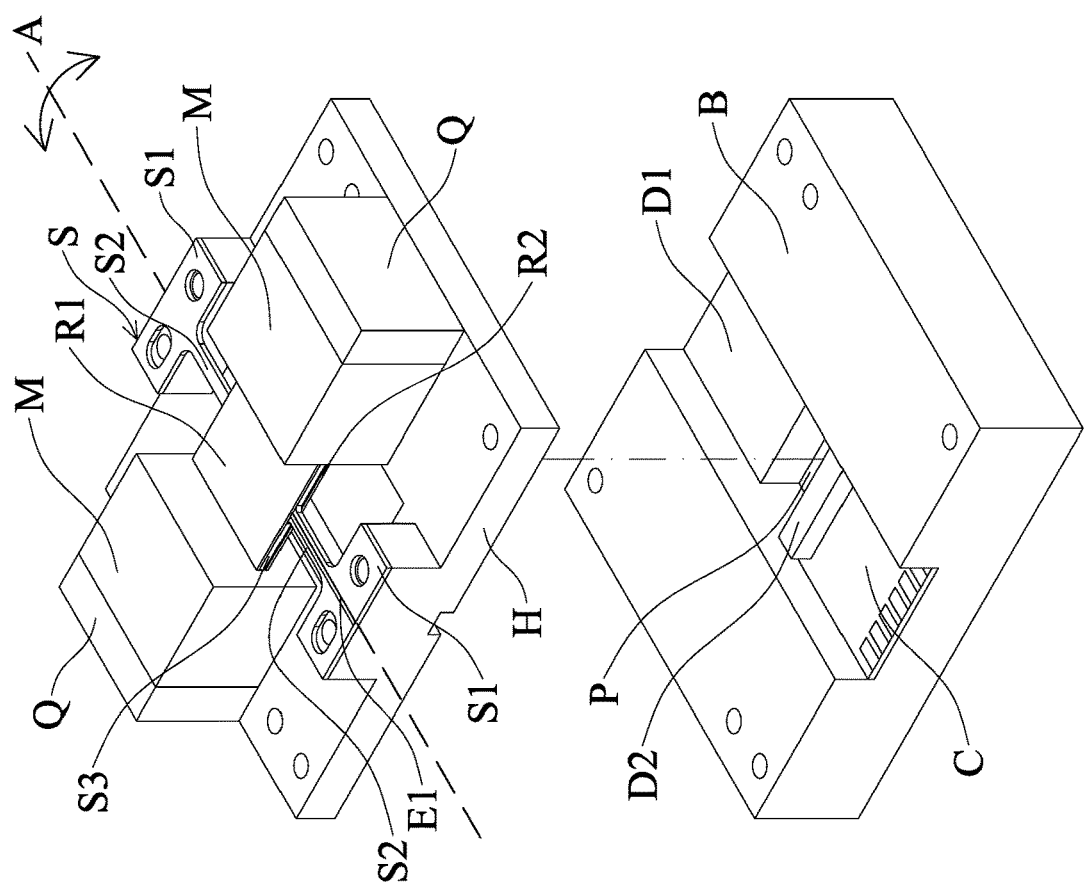
FIG. 1 is an exploded diagram of a driving mechanism in accordance with an embodiment of the invention.
Figure 2:
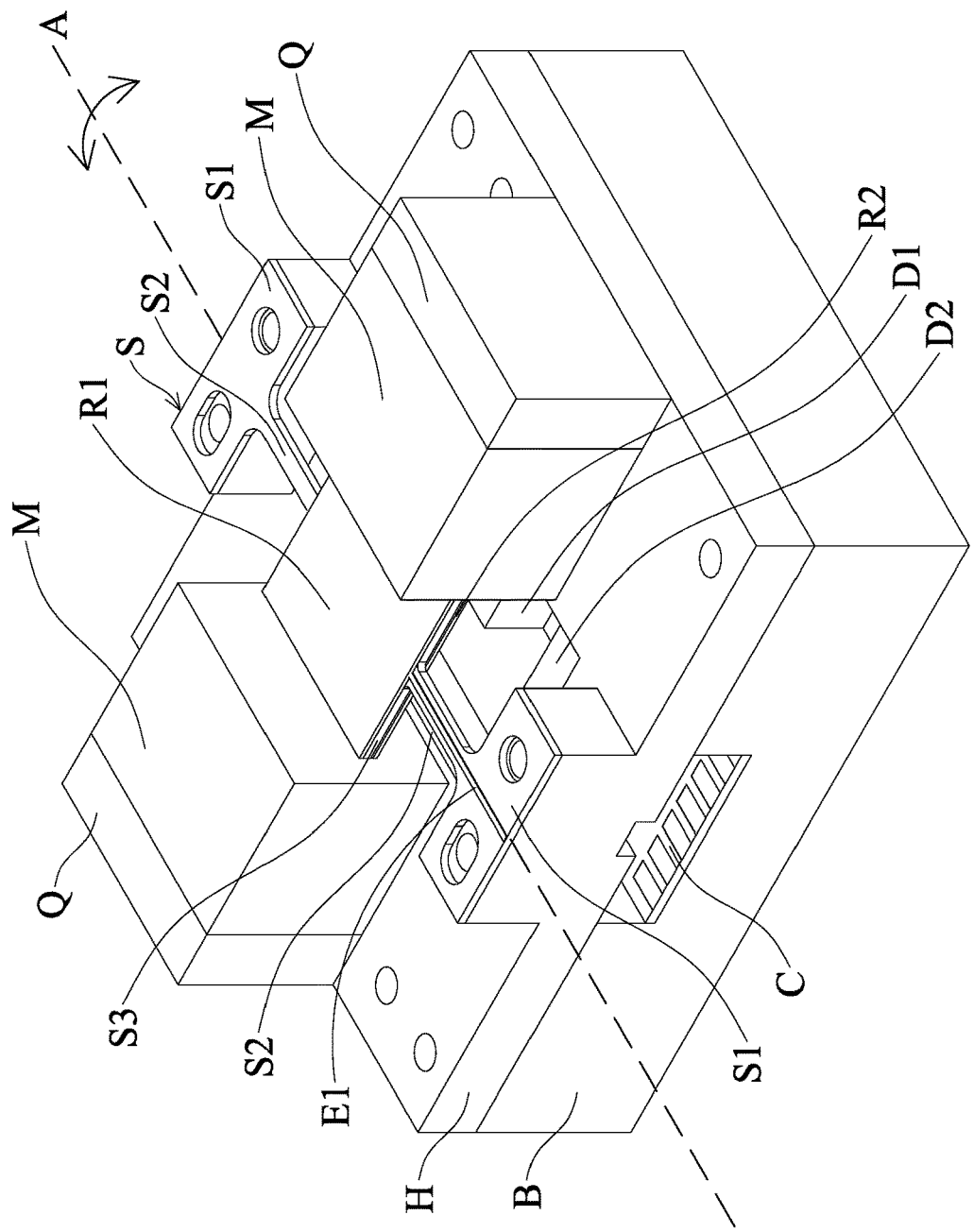
FIG. 2 is a perspective diagram of the driving mechanism in FIG. 1 after assembly.
Figure 3:
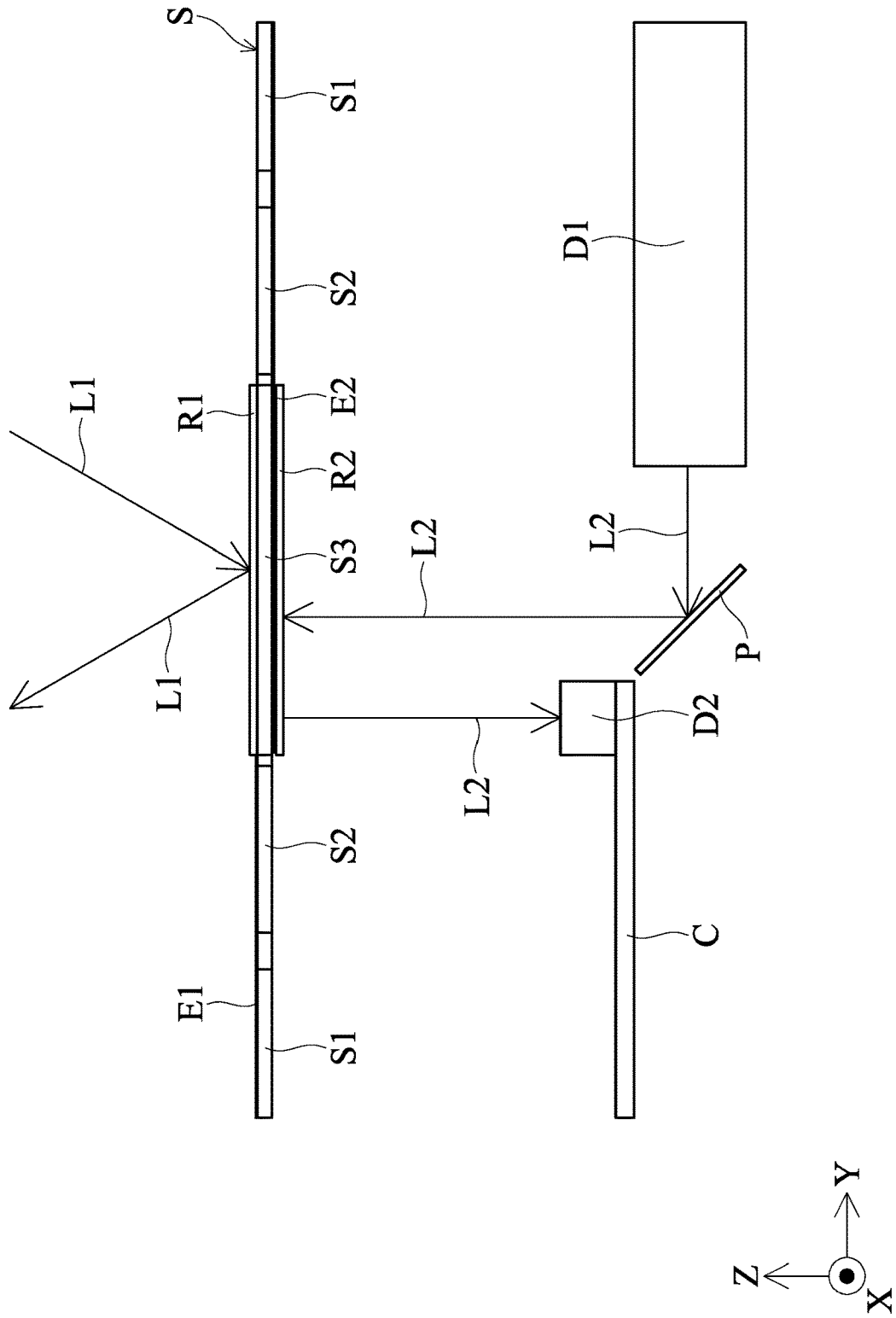
FIG. 3 is a perspective diagram showing an optical system in the driving mechanism of FIGS. 1 and 2.
Figure 4:
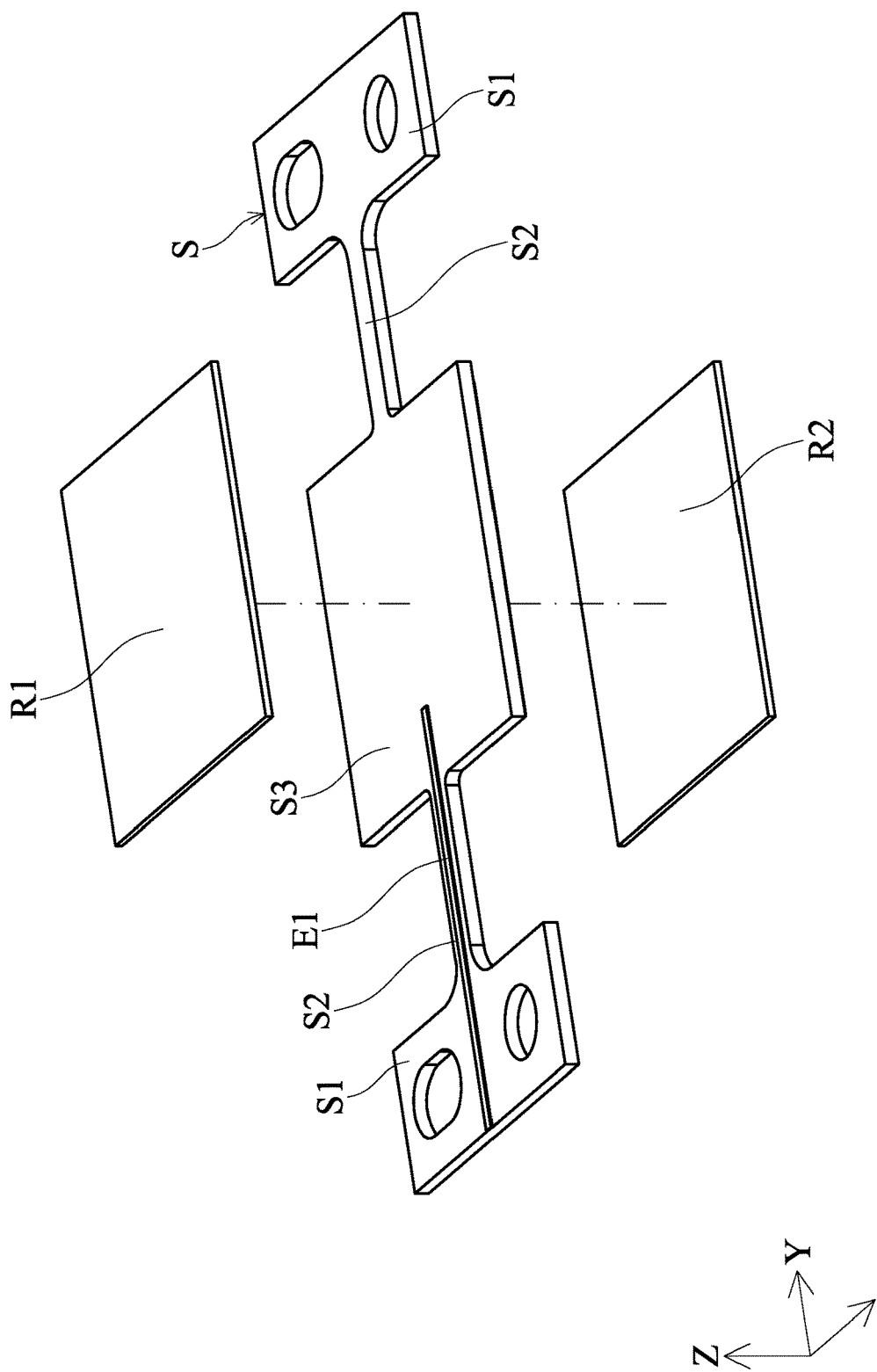
FIG. 4 is an exploded diagram of the spring sheet S, the optical element R1, and the mirror R2 in FIG. 3.

Referring to FIGS. 1-4, FIG. 1 is an exploded diagram of a driving mechanism in accordance with an embodiment of the invention, FIG. 2 is a perspective diagram of the driving mechanism in FIG. 1 after assembly, FIG. 3 is a perspective diagram showing an optical system in the driving mechanism of FIGS. 1 and 2, and FIG. 4 is an exploded diagram of the spring sheet S, the optical element R1, and the mirror R2 in FIG. 3.

As shown in FIGS. 1 and 2, the driving mechanism in this embodiment is used to drive an optical element R1 (e.g. reflecting mirror) to rotate back and forth within a range, wherein the optical element R1 can reflect light to an object for the purpose of depth sensing or 3D scanning.

The driving mechanism includes an upper module and a lower module. The lower module primarily comprises a base B, a light emitter D1 disposed on the base B, a light path adjusting element P, a circuit board C, and a light receiver D2 disposed on the circuit board C. The upper module primarily comprises a fixed member H, a spring sheet S, two magnets M, and two magnetic permeable sheets Q. The fixed member H is secured on the base B, and the spring sheet S, the magnets M, and the magnetic permeable sheets Q are disposed on the fixed member H. Here, the fixed member H and the base B constitute a fixed part of the driving mechanism. The optical element R1 is disposed on a stage S3 of the spring sheet S, and they can rotate relative to the fixed member H to perform rapid The spring sheet S is used as a movable part of the driving mechanism, and it has two fixed ends Si affixed to the fixed member H, two deformable portions S2, and a stage S3. The optical element R1 is disposed on the top side of the stage S3, and the deformable portions S2 respectively connecting the fixed ends Si to the stage S3.

Specifically, a mirror R2 and at least a coil E2 are disposed on the bottom side of the stage S3 (FIG. 3). When an external circuit applies a current signal to the coil E2 via the circuit E1 on the spring sheet S, the magnet M and the coil E2 (driving assembly) can generate a magnetic force to rotate the stage S3 around a long axis A (first axis) of the spring sheet S.

As shown in FIG. 3, when an external light source (not shown) emits a sensing light L1 to the optical element R1 on the stage S3, the optical element R1 reflects the sensing light L1 to an object for depth sensing or 3D scanning. Additionally, the light emitter D1 in the lower module of the driving mechanism can emit another sensing light L2 to the light path adjusting element P (e.g. prism). The light path adjusting element P can guide the sensing light L2 to the mirror R2 on the bottom side of the stage S3, and the mirror R2 reflects the sensing light L2 to the light receiver D2, so as to obtain posture angle information of the optical element R1 relative to the fixed member H. When the light receiver D2 receives the sensing light L2 that is reflected by the mirror R2, it can transmit an electrical signal to a processor via the circuit board C, whereby closed-loop rotational control for the stage S3 of the spring sheet S and the optical element R1 can be performed.

In some embodiments, the mirror R2 may be omitted from the driving mechanism, and the bottom surface of the stage S3 may be smooth or polished to reflect the sensing light L2. In some embodiments, a through hole may be formed on the stage S3 for receiving the optical element R1 (e.g. double-sided mirror) without the mirror R2.

It should be noticed that the spring sheet S in this embodiment has a first resonance frequency with respect to the fixed part (the fixed member H and the base B), and an AC current signal can be applied to the coil E2 on the stage S3, wherein the frequency of the AC current signal corresponds to the first resonance frequency. Thus, the stage S3 can be driven to rapidly rotate back and forth within a range around the long axis A of the spring sheet S for depth sensing or 3D scanning of an object. For example, the first resonance frequency is about 300-1000 Hz, and the frequency of the AC current signal is about 0.9 to 1.1 times of the first resonance frequency, so that the rotational angle of the stage S3 and the scanning range of the sensing light L1 can be increased.

Figure 5:
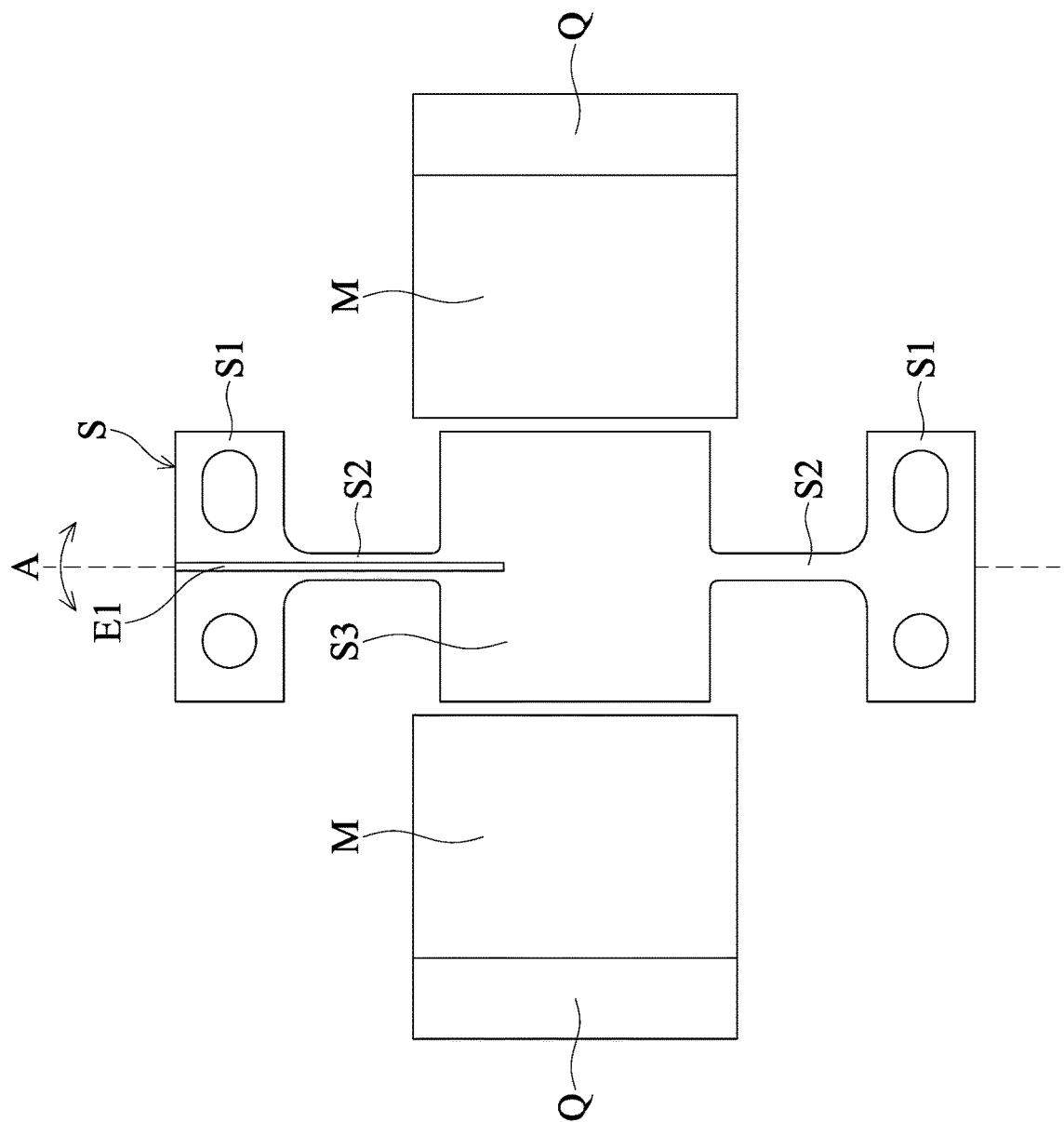
FIG. 5 is a top view of the spring sheet S, the magnets M, and the magnetic permeable sheets Q in FIGS. 1 and 2.
Figure 6:
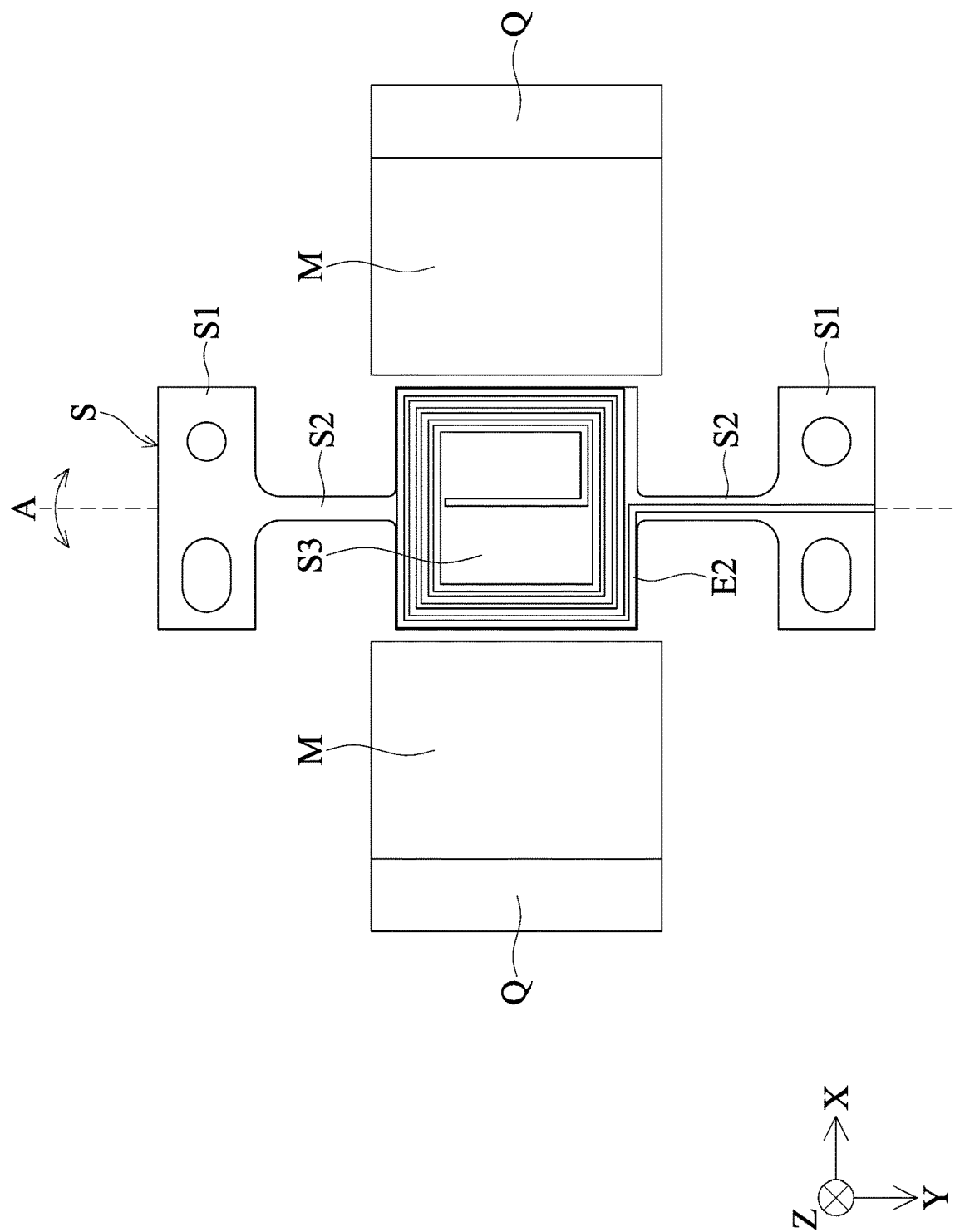
FIG. 6 is a bottom view of the spring sheet S, the magnets M, and the magnetic permeable sheets Q in FIGS. 1 and 2.

FIG. 5 is a top view of the spring sheet S, the magnets M, and the magnetic permeable sheets Q in FIGS. 1 and 2, and FIG. 6 is a bottom view of the spring sheet S, the magnets M, and the magnetic permeable sheets Q in FIGS. 1 and 2. As shown in FIGS. 5 and 6, the spring sheet S may comprise metal and have a rectangular structure. The magnets M and the magnetic permeable sheets Q are arranged on two long sides of the spring sheet S, and the circuit E1 and the coil E2 are respectively formed on the top and bottom sides of the spring sheet S by metallic printing ink or circuit-on-metal technology. In some embodiments, the spring sheet S may comprise SUS 304H stainless steel that has high mechanical strength and reliability.

As mentioned above, the circuit E1 and the coil E2 can be integrally formed on the top and bottom sides of the spring sheet S, wherein an insulating layer is formed between the circuit E1 and the spring sheet S, and another insulating layer is formed between the coil E2 and the spring sheet S. The circuit E1 and the coil E2 can be electrically connected to each other via the stage S3 of the spring sheet S. When an external circuit applies a current signal to the coil E2 on the bottom side of the spring sheet S via the circuit El, the magnet M and the coil E2 can produce a magnetic force to rotate the stage S3 around the long axis A of the spring sheet S, so as to perform depth sensing or 3D scanning of an object.

Specifically, the circuit E1 and the coil E2 in FIGS. 5-6 both have at least a segment parallel to the long axis A (first axis), and the segment at least partially overlaps the long axis A when viewed along the Z direction that is perpendicular to the spring sheet S. In some embodiments, the circuit E1 and the coil E2 may also have a plurality of segments that are parallel to but do not overlap the long axis A when viewed along the Z direction.

Figure 7:
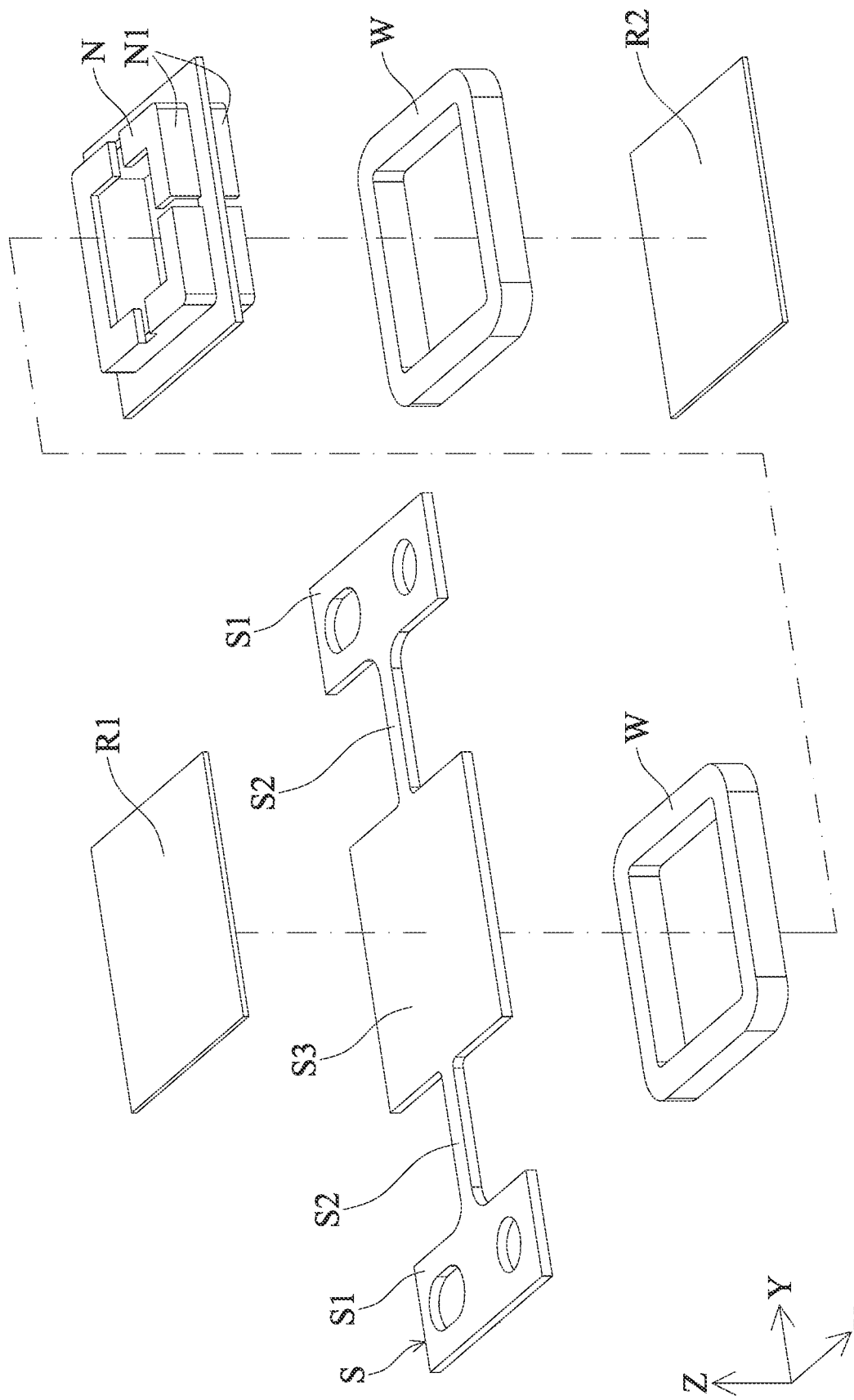
FIGS. 7 and 8 are exploded and perspective diagrams of a spring sheet S, an optical element R1, a mirror R2, two coils W, and a bobbin N, in accordance with another embodiment of the invention.
Figure 8:
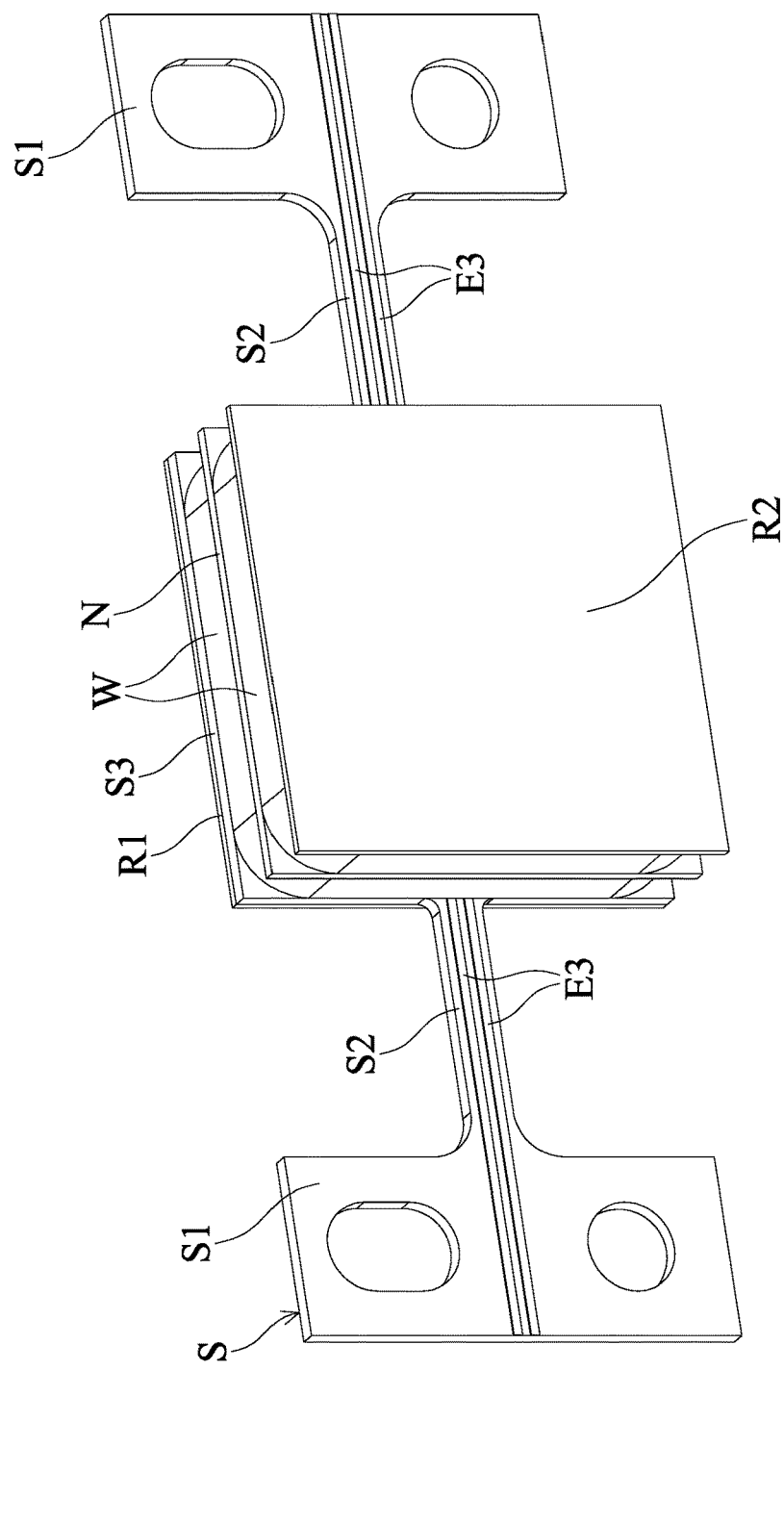
Figure 9:
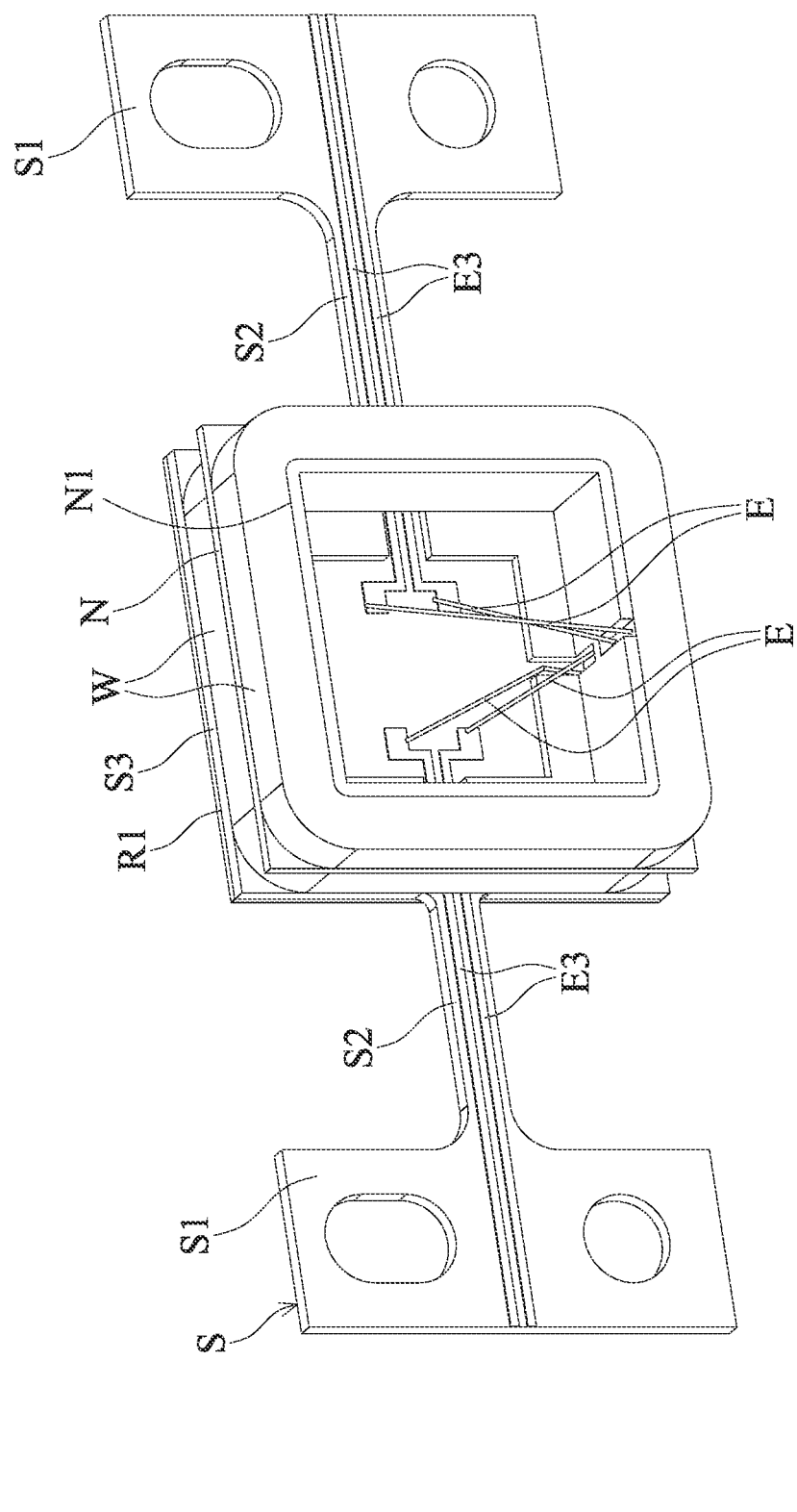
FIG. 9 is a perspective diagram that shows the coils W in FIG. 8 electrically connecting to the circuits E3 on the spring sheet S.
Figure 10:
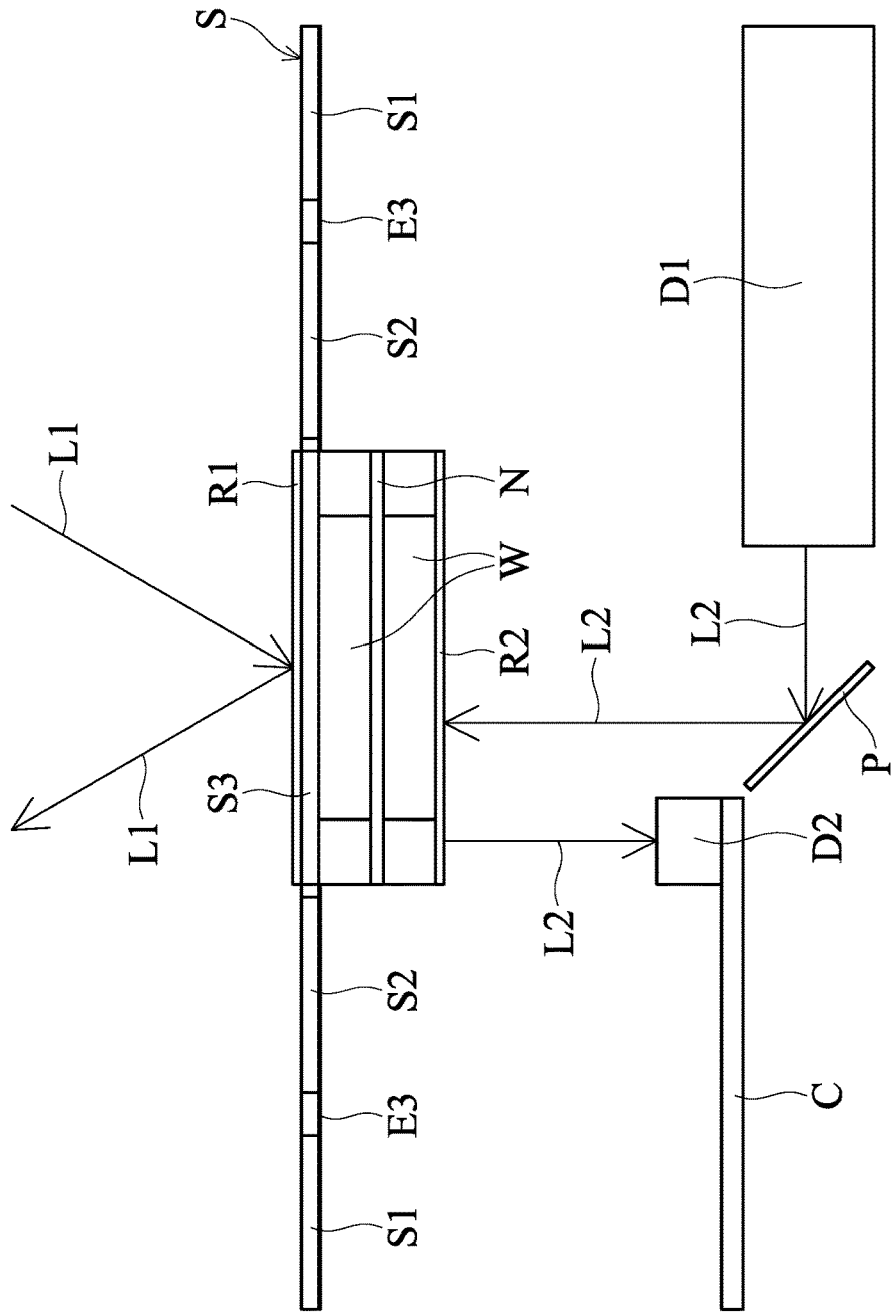
FIG. 10 is a perspective diagram of an optical system in accordance with another embodiment of the invention.

FIGS. 7 and 8 are exploded and perspective diagrams of a spring sheet S, an optical element R1, a mirror R2, two coils W, and a bobbin N, in accordance with another embodiment of the invention. FIG. 9 is a perspective diagram that shows the coils W in FIG. 8 electrically connecting to the circuits E3 on the spring sheet S. FIG. 10 is a perspective diagram of an optical system in accordance with another embodiment of the invention.

As shown in FIGS. 7-10, this embodiment is different from FIGS. 1-6 in that a plurality of circuits E3 are integrally formed on the bottom side of the spring sheet S by metallic printing ink or circuit-on-metal technology, wherein an insulating layer is formed between the circuits E3 and the spring sheet S to prevent a short circuit therebetween.

In this embodiment, the stage S3 is used as a movable part of the driving mechanism, and the bobbin N (supporting frame) is affixed to the stage S3 (movable part). Specifically, two coils W are disposed around a sidewall N1 of the bobbin N (supporting frame), wherein the sidewall N1 is perpendicular to the main surface of the stage S3 (movable part). The two coils W in FIGS. 9-10 are respectively connected to the circuits E3 via the wires E, whereby an external circuit can transmit electrical signals to the coils W via the wires E and the circuits E3. It should be noted since two coils W are provided on the bottom side of the spring sheet S, the magnetic force for driving the stage S3 to rotate can be increased, and the range of depth sensing or 3D scanning can also be increased.

Figure 11:
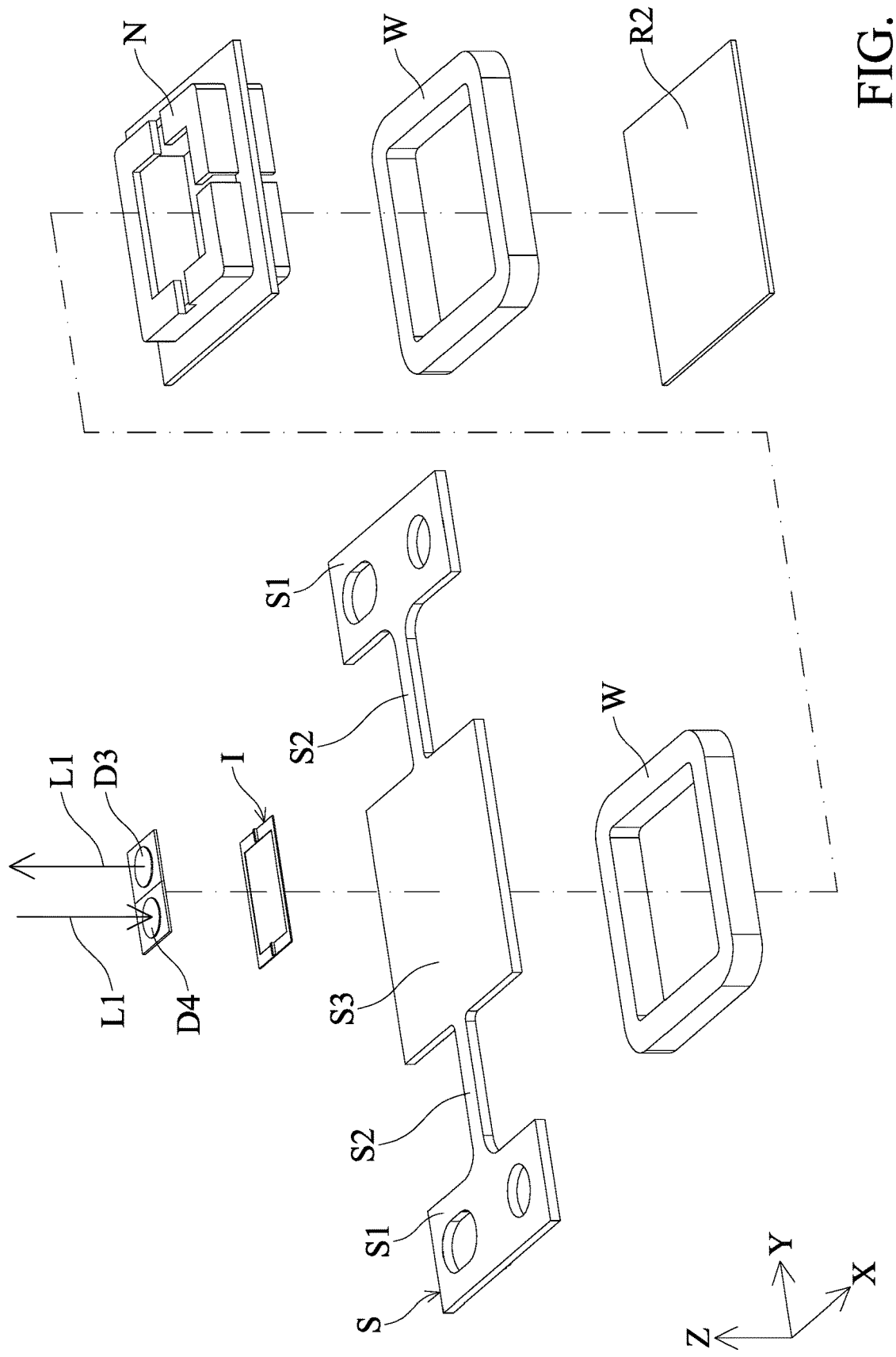
FIGS. 11 and 12 are exploded and perspective diagrams of a light emitter D3, a light receiver D4, and a substrate I disposed on a spring sheet S, in accordance with another embodiment of the invention.
Figure 12:
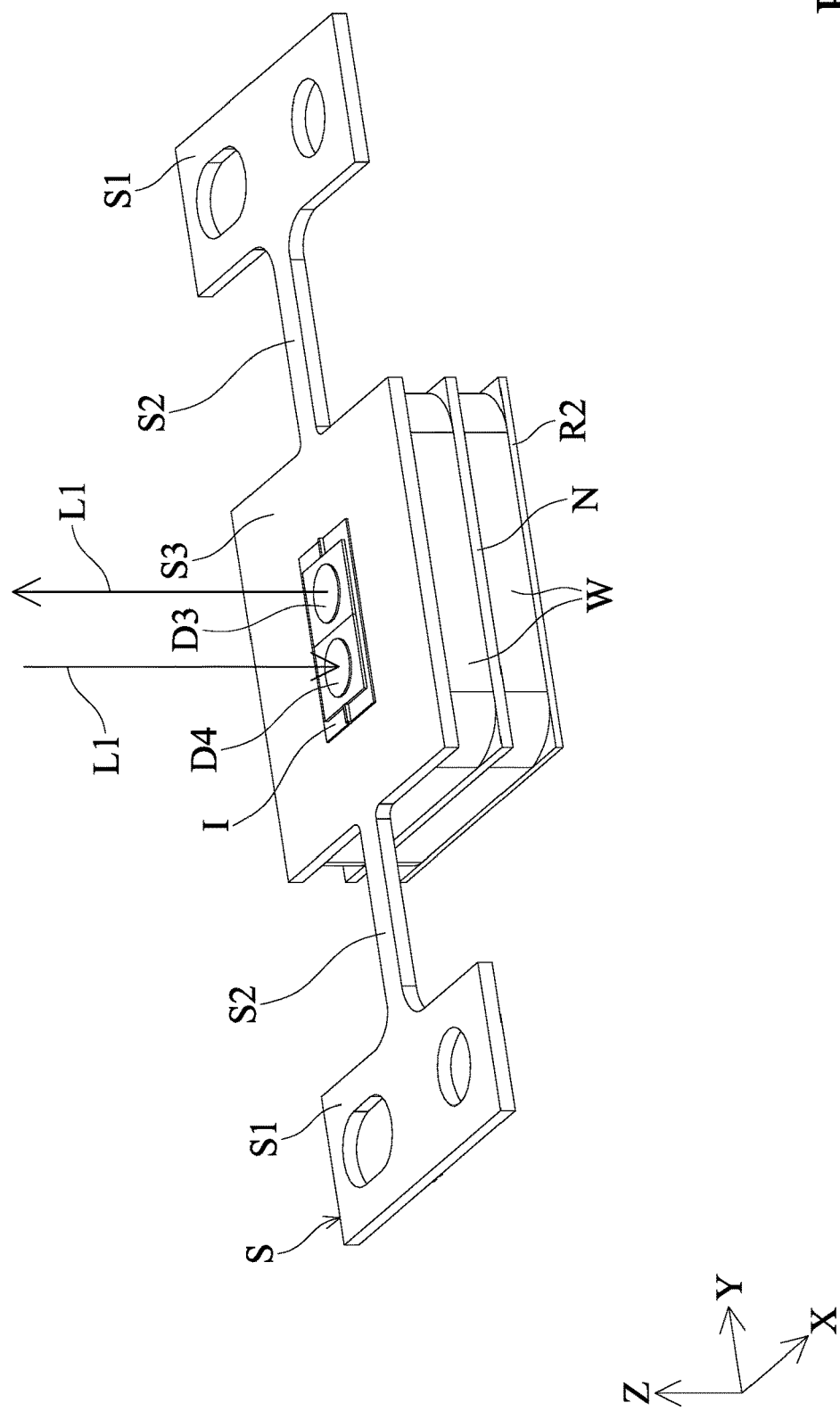
Figure 13:
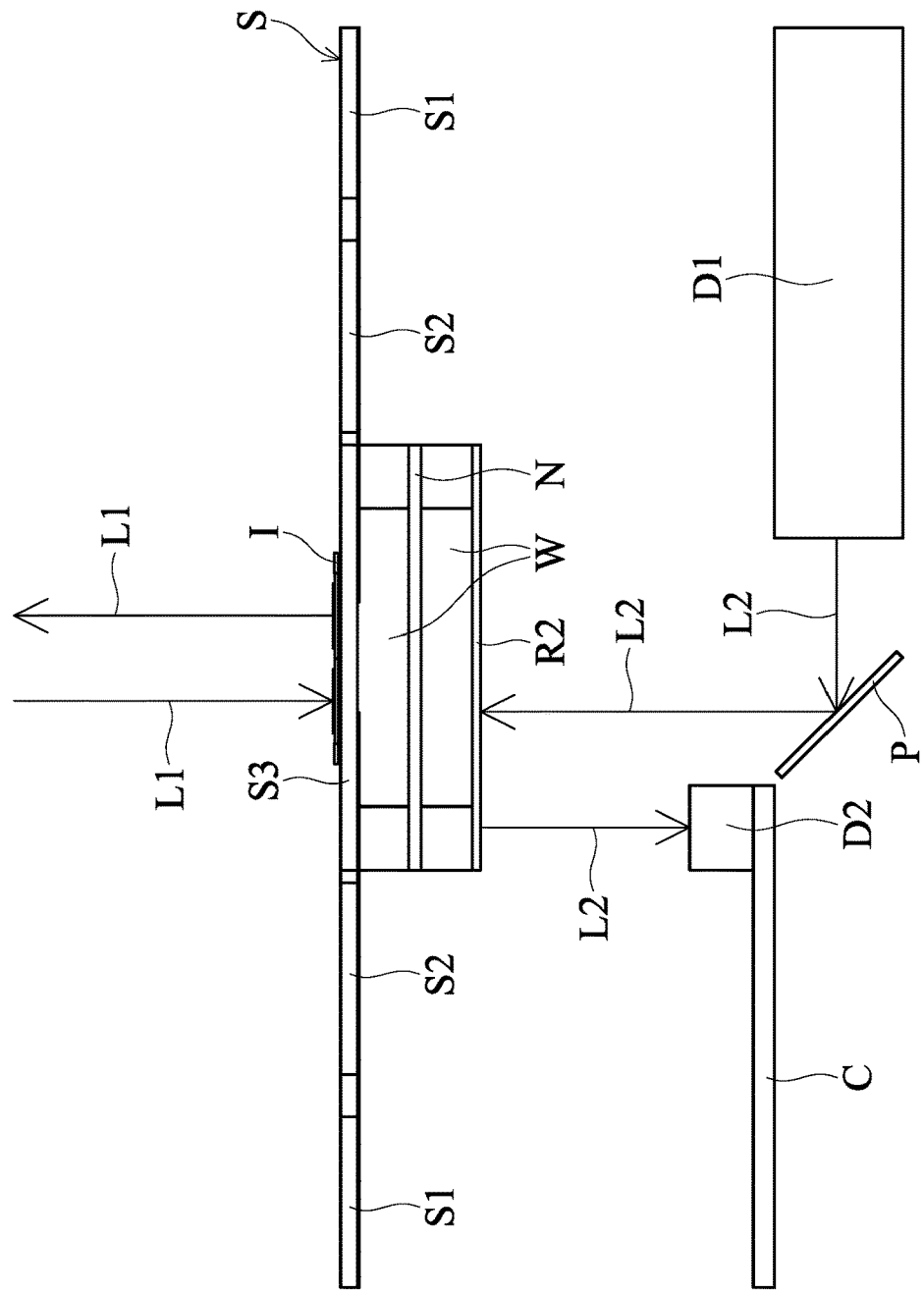
FIG. 13 is a perspective diagram of an optical system in accordance with another embodiment of the invention.

FIGS. 11 and 12 are exploded and perspective diagrams of a light emitter D3, a light receiver D4, and a substrate I disposed on a spring sheet S, in accordance with another embodiment of the invention. FIG. 13 is a perspective diagram of an optical system in accordance with another embodiment of the invention.

As shown in FIGS. 11-13, this embodiment is different from FIGS. 7-10 in that a light emitter D3, a light receiver D4, and a substrate I are disposed on a spring sheet S, and the optical element R1 shown in FIGS. 7-10 is omitted from the driving mechanism. FIG. 13 shows that the substrate I is disposed on the top side of the spring sheet S, and the light emitter D3 and the light receiver D4 are disposed on the substrate I, wherein an insulating layer is formed between the substrate I and the spring sheet S. For example, the light emitter D3 and the light receiver D4 may respectively comprise laser diode and photo diode, and the substrate I may comprise a circuit board for electrically connecting the light emitter D3 and the light receiver D4 to an external circuit.

By directly affixing the light emitter D3 and the light receiver D4 to the spring sheet S, the optical element R1 (e.g. mirror) can be omitted from the driving mechanism. Thus, the positioning accuracy during assembly and the performance of depth sensing or 3D scanning can be greatly increased. Moreover, the production cost and the dimensions of the driving mechanism can also be reduced. In some embodiments, only one of the light emitter D3 and the light receiver D4 is disposed on the spring sheet S, so that the circuits on the substrate I can be simplified.

Figure 14:
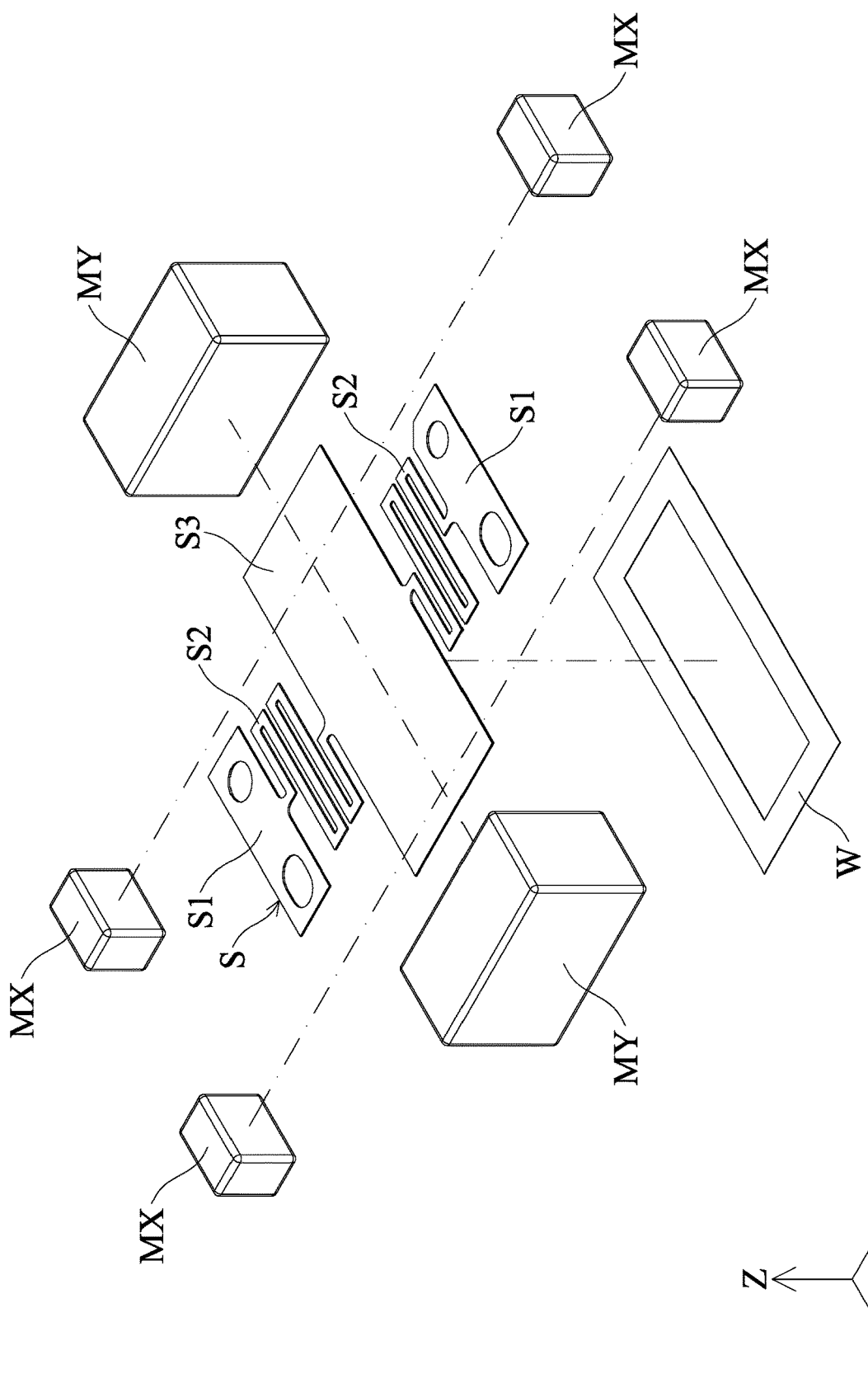
FIG. 14 is an exploded diagram of a spring sheet S, a coil W, and several magnets MX and MY, in accordance with another embodiment of the invention.
Figure 15:
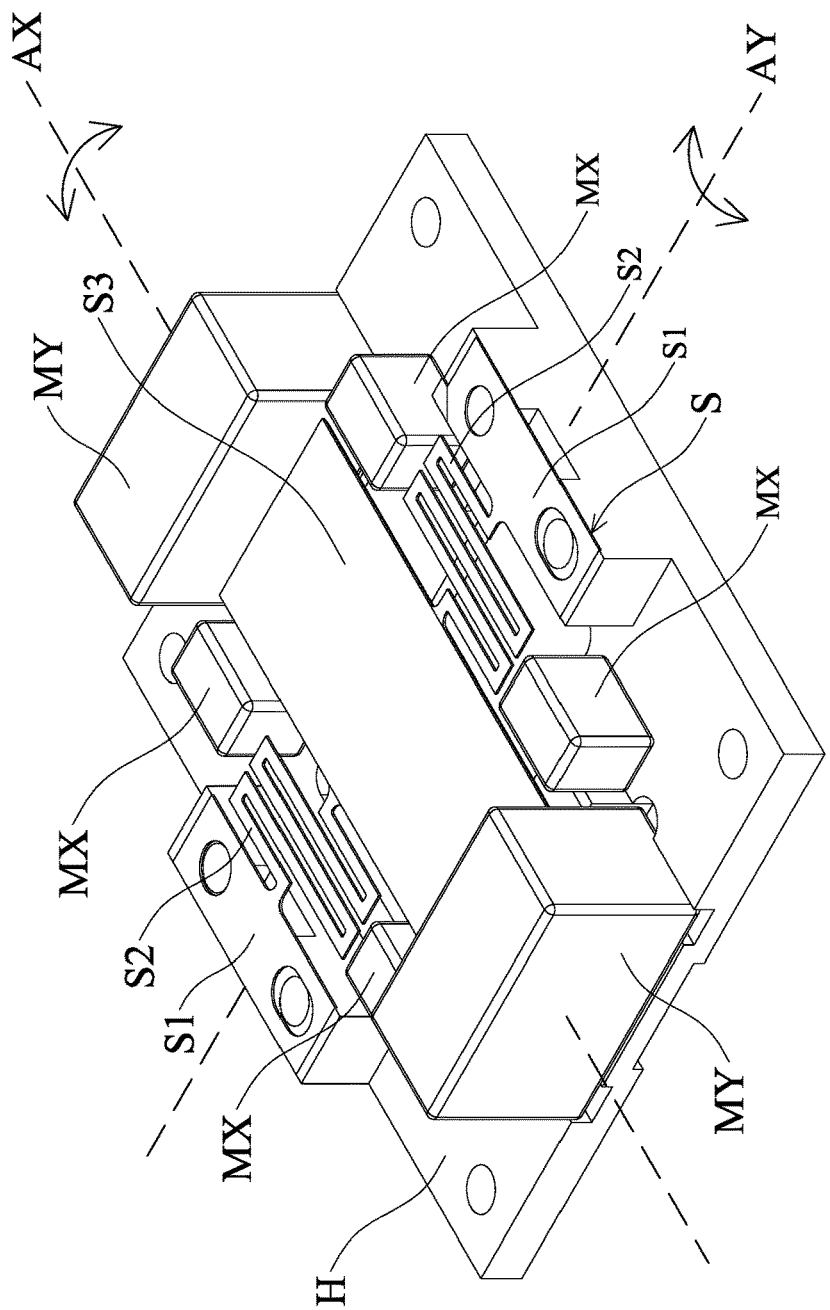
FIG. 15 is a perspective diagram showing the spring sheet S, the coil W, and the magnets MX and MY in FIG. 14 assembled to a fixed member H.
Figure 16:
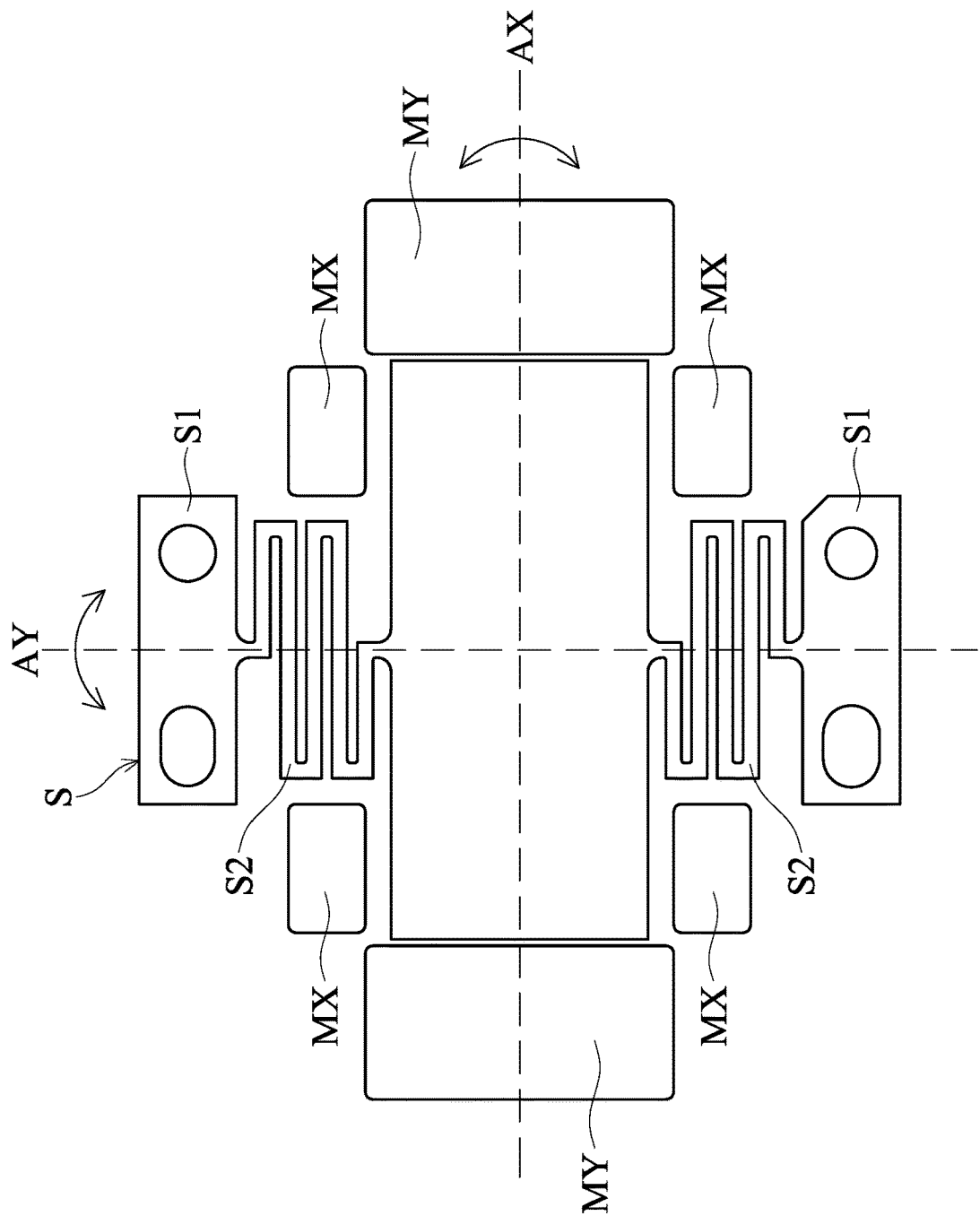
FIG. 16 is a perspective diagram showing the relative positions of the spring sheet S and the magnets MX and MY in FIG. 15.

FIG. 14 is an exploded diagram of a spring sheet S, a coil W, and several magnets MX and MY, in accordance with another embodiment of the invention. FIG. 15 is a perspective diagram showing the spring sheet S, the coil W, and the magnets MX and MY in FIG. 14 assembled to a fixed member H. FIG. 16 is a perspective diagram showing the relative positions of the spring sheet S and the magnets MX and MY in FIG. 15.

As shown in FIGS. 14-16, the spring sheet S and the magnets MX and MY in this embodiment are affixed to the fixed member H, wherein the coil W can be integrally formed on the bottom side the spring sheet S by metallic printing ink or circuit-on-metal technology. Specifically, the spring sheet S has two meandering deformable portions S2. When the coil W is energized by an electrical current signal, the coil W and the magnets MY (first magnets) can produce a first magnetic force driving the stage S3 to rotate around a first axis AY, and the coil W and the magnets MX (second magnets) can produce a second magnetic force driving the stage S3 to rotate around a second axis AX.

For exemple, the spring sheet S may have a first resonance frequency and a second resonance frequency with respect to the fixed member H, corresponding to the first and second axes AY and AX. When a first AC current signal and a second AC current signal are sequentially applied to the coil W in a first time interval and a second time interval, the stage S3 of the spring sheet S can be driven to rotate around the first and second axes AY and AX to perform depth sensing or 3D scanning of an object, wherein the frequencies of the first and second AC current signals correspond to the first and second resonance frequencies.

In some embodiments, the aforementioned driving mechanism may utilize the two coils W and the bobbin N in FIGS. 7-10 with the circuits E3 and wires E (FIGS. 8-10). Thus, two different current signals can be individually applied to the two coils W, to drive the stage S3 and the optical element R1 (e.g. mirror) on the stage S3 to rotate around the first axis AY and the second axis AX at the same time. Here, the second resonance frequency could be over 10 times of the first resonance frequency.

As shown in FIG. 16, four magnets MX and two magnets MY are provided in the driving mechanism, wherein the stage S3 and the magnets MY overlap when viewed in the X direction, and the stage S3 and the magnets MX overlap when viewed in the Y direction. Therefore, the stage S3 and the optical element R1 thereon can be driven to rotate around the first axis AY and the second axis AX at the same time by the coil W and the magnets MY and MX (driving assembly), thus greatly increasing the range of depth sensing or 3D scanning.

Figure 17:
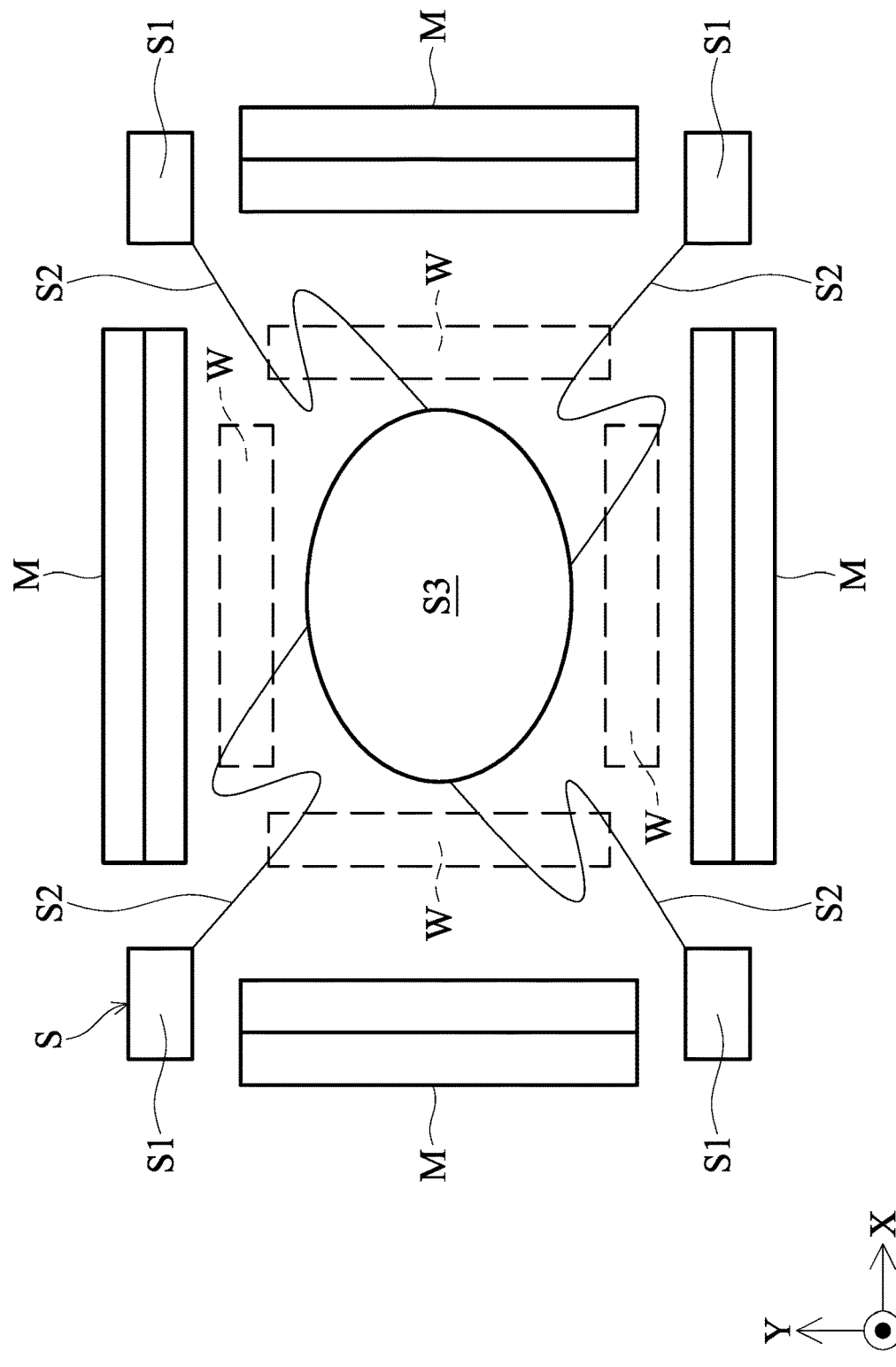
FIGS. 17 is a perspective diagram showing the relative positions of a spring sheet S, at least a coil W, and several magnets M, in accordance with another embodiment of the invention.

FIGS. 17 is a perspective diagram showing the relative positions of a spring sheet S, at least a coil W, and several magnets M, in accordance with another embodiment of the invention. As shown in FIG. 17, the spring sheet S in this embodiment has four fixed ends S1 affixed to the fixed part (the fixed member H and the base B), a stage S3 for carrying the optical element R1, and four deformable portions S2 connecting the four fixed ends S1 to the stage S3. Additionally, four magnets M are affixed to the fixed part, and at least a coil W is affixed to the stage S3. When an electrical current signal is applied to the coil W, a magnetic force can be produced to rotate the stage S3 back and forth within a range relative to the fixed part. Here, the spring sheet S can define a rectangular area, and the four fixed ends Si of the spring sheet S are located at the four corners of the rectangular area.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for driving an optical element to move, comprising:
    a fixed part;
    a flat movable part, connected to the fixed part for holding the optical element, wherein the movable part has a first resonance frequency with respect to the fixed part;
    a driving assembly, configured to drive the movable part to rotate back and forth within a range relative to the fixed part; and
    a supporting frame, affixed to the movable part and having a sidewall, wherein the sidewall is perpendicular to a main surface of the movable part, and a part of the driving assembly is disposed on the sidewall of the supporting frame.

2. The driving mechanism as claimed in claim 1, wherein the movable part has a spring sheet that has two fixed ends affixed to the fixed part and a stage for carrying the optical element, and the driving assembly has at least a magnet and at least a coil respectively disposed on the fixed part and the sidewall of the supporting frame.

3. The driving mechanism as claimed in claim 2, wherein the spring sheet has two deformable portions respectively extending from the fixed ends to the stage.

4. The driving mechanism as claimed in claim 2, wherein the spring sheet has a longitudinal structure, and the stage rotates around a long axis of the spring sheet.

5. The driving mechanism as claimed in claim 2, wherein an AC current signal is applied to the coil, and the frequency of the AC current signal corresponds to the first resonance frequency.

6. The driving mechanism as claimed in claim 5, wherein the frequency of the AC current signal is from 0.9 to 1.1 times of the first resonance frequency.

7. The driving mechanism as claimed in claim 2, further comprising a plurality of magnets and magnetic permeable sheets respectively connected to the magnets, wherein the spring sheet has a substantially rectangular structure, and the magnets and the magnetic permeable sheets are disposed on two long sides of the spring sheet.

8. The driving mechanism as claimed in claim 2, wherein the coil is integrally formed on the spring sheet by metallic printing ink or circuit-on-metal technology.

9. The driving mechanism as claimed in claim 8, further comprising a circuit integrally formed on the spring sheet by metallic printing ink or circuit-on-metal technology, wherein the circuit and the coil are formed on opposite sides of the spring sheet.

10. The driving mechanism as claimed in claim 2, further comprising a light emitter, a light receiver, and a mirror, wherein the optical element is disposed on a top side of the stage, the mirror is disposed on a bottom side of the stage, and a sensing light is generated from the light emitter and reflected by the mirror to the light receiver for sensing a posture angle of the optical element.

11. The driving mechanism as claimed in claim 2, wherein the driving assembly further has two coils wound on the supporting frame.

12. The driving mechanism as claimed in claim 11, further comprising two circuits respectively connected to the coils and integrally formed on the spring sheet by metallic printing ink or circuit-on-metal technology.

13. The driving mechanism as claimed in claim 2, further comprising a light emitter and a light receiver, wherein a sensing light is generated from the light emitter to the light receiver, and at least one of the light emitter and the light receiver is disposed on the spring sheet.

14. The driving mechanism as claimed in claim 2, further comprising a light emitter and a light receiver, wherein a sensing light is generated from the light emitter and reflected by the stage to the light receiver for sensing a posture angle of the optical element and the stage.

15. The driving mechanism as claimed in claim 2, wherein the stage forms a through hole, and the optical element comprises a double-sided mirror received in the through hole.

16. The driving mechanism as claimed in claim 2, wherein the driving assembly further has a plurality of magnets including a plurality of first magnets and second magnets, the coil and the first magnets produces a first magnetic force driving the stage to rotate relative to the fixed part around a first axis, and the coil and the second magnets produces a second magnetic force driving the stage to rotate relative to the fixed part around a second axis.

17. The driving mechanism as claimed in claim 16, wherein the spring sheet has two meandering deformable portions respectively extending from the fixed ends to the stage.

18. The driving mechanism as claimed in claim 16, wherein the spring sheet further has a second resonance frequency with respect to the fixed part, and a first AC current signal and a second AC current signal are sequentially applied to the coil in a first time interval and a second time interval, wherein the frequencies of the first and second AC current signals correspond to the first and second resonance frequencies.

19. The driving mechanism as claimed in claim 16, wherein the spring sheet further has a second resonance frequency with respect to the fixed part, and the driving assembly further has two coils, wherein the first AC current signal and a second AC current signal are respectively applied to the two coils, and the frequencies of the first and second AC current signals correspond to the first and second resonance frequencies.

20. The driving mechanism as claimed in claim 2, wherein the driving assembly drives the stage to rotate around a first axis, and the driving mechanism further comprises a circuit integrally formed on the spring sheet by metallic printing ink or circuit-on-metal technology, wherein a segment of the circuit is parallel to the first axis, and the segment at least partially overlaps the first axis when viewed in a direction perpendicular to the spring sheet.

21. The driving mechanism as claimed in claim 2, wherein the driving assembly drives the stage to rotate around a first axis, and the driving mechanism further comprises a circuit integrally formed on the spring sheet by metallic printing ink or circuit-on-metal technology, wherein a plurality of segments of the circuit are parallel to the first axis, and the segments do not overlap the first axis when viewed in a direction perpendicular to the spring sheet.

22. The driving mechanism as claimed in claim 1, wherein the movable part comprises a spring sheet that has four fixed ends affixed to the fixed part, a stage for carrying the optical element, and four deformable portions respectively connecting the four fixed ends to the stage, wherein the driving assembly has a plurality of magnets disposed on the fixed part and at least a coil disposed on the stage, and the fixed ends are located at four corners of a rectangular area that is defined by the spring sheet.

* * * * *